Oct. 7, 1952  A. B. LAKEY  2,612,775
THRUST MEASURING DEVICE
Filed Dec. 19, 1946
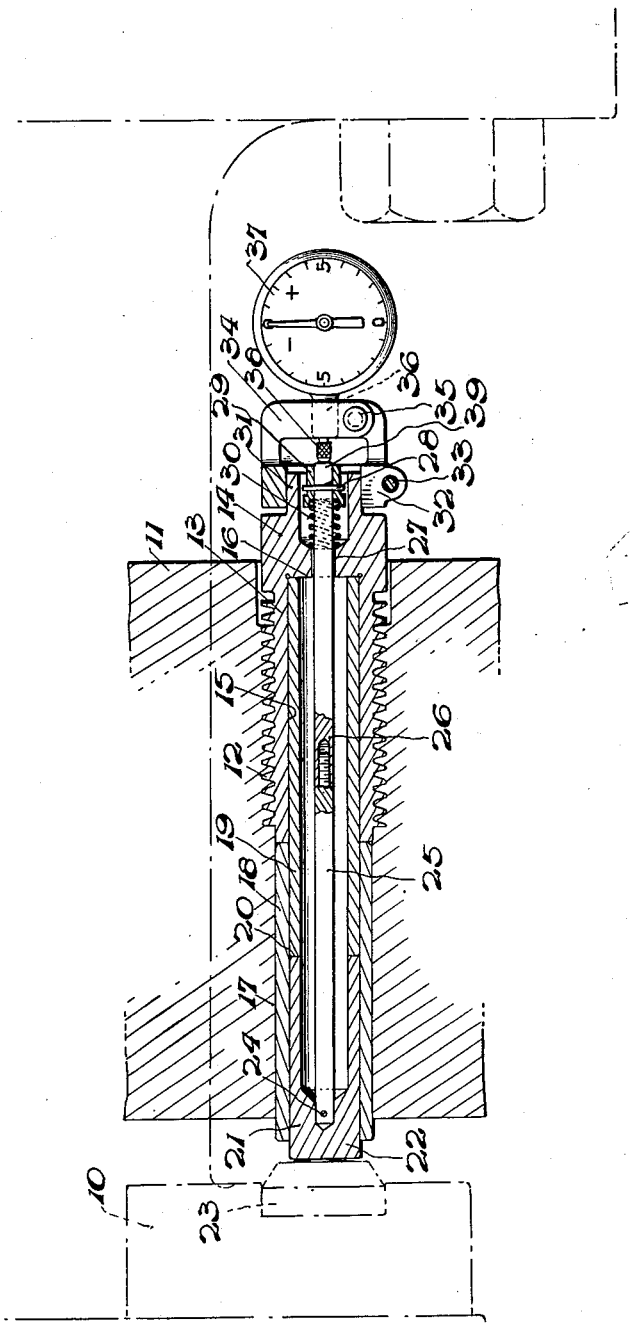
Inventor
Arthur B. Lakey
By Cameron, Kerkam & Sutton
Attorneys Patented Oct. 7, 1952

2,612,775

UNITED STATES PATENT OFFICE 2,612,775

THRUST MEASURING DEVICE

Arthur B. Lakey, Philadelphia, Pa., assignor to Kingsbury Machine Works, Inc., Philadelphia, Pa., a corporation of Delaware Application December 19, 1946, Serial No. 717,124

6 Claims. (Cl. 73—140)

This invention relates to thrust measuring devices for thrust bearings, and more particularly to a thrust measuring unit that may be readily installed or transferred from one bearing to another as desired for measuring thrust.

It is common practice in thrust bearings for horizontal, vertical, and inclined shafts and for bearings applied to a wide variety of services to mount each thrust bearing shoe on an adjustable jackscrew. Also, where the shoes are mounted on an overlapping series of equalizing plates or blocks, as for example in Kingsbury Patent No. 1,361,073, granted December 10, 1920, for automatically distributing the load between a plurality of shoes, it has been proposed to mount some of the equalizing members on jackscrews. As is apparent, the thrust load on any given bearing may be readily determined if there is known the proportionate share of the load carried by a single shoe or an equalizing plate or any other suitable member in the line of thrust transmitted from the shaft to the housing or foundation. If such shoe, plate or the like is mounted on a jackscrew, a thrust measuring device which can be installed in place of the jackscrew provides a simple way of determining thrust load.

It is an object of this invention to provide a thrust measuring device which may be readily installed as a substitute for the jackscrew so as to provide a simple thrust measuring instrumentality that will accurately determine the proportion of load carried on the member associated with the jackscrew that has been replaced.

Another object of this invention is to provide a device of the type characterized which while in service will function properly as a jackscrew so that there is no interruption in the proper action of the bearing.

Another object of this invention is to provide a device of the type characterized which may be readily transferred from bearing to bearing so that a single unit may be used for determining thrust in any desired number of bearings.

Another object of this invention is to provide a device of the type characterized which may readily be left as a permanent installation with any given bearing if it is desired that a measurement of thrust shall be available at all times.

Another object of this invention is to provide a thrust measuring unit which may be installed in place of a conventional jackscrew and which is simple and rugged in construction, readily installed and removed, and durable and efficient in operation.

Other objects will appear as the description of the invention proceeds.

The invention is capable of receiving a variety of expressions, only one of which is shown on the accompanying drawing, but it is to be expressly understood that the drawing is for purposes of illustration only and is not to be construed as a definition of the limits of the invention, reference being had to the appended claims for that purpose.

Referring in detail to the accompanying drawing which illustrates in axial section and somewhat schematically a thrust measuring unit embodying the present invention, 10 designates diagrammatically any suitable thrust shoe, or it could be an equalizing plate or any other suitable member adapted to be mounted on a jackscrew in the line of transmission of thrust and carrying a known proportion of the total thrust load. 11 designates diagrammatically any suitable base, foundation or supporting member provided with a threaded aperture 12 in which a jackscrew is intended to be installed for the purpose of supporting the shoe or other member 10.

In conformity with the present invention a thrust measuring unit is adapted to be installed in the threaded aperture 12 in place of the jackscrew, where said unit will, without interruption of the operation of the bearing, continue to function the same as the replaced jackscrew and, at the same time, provide an accurate measure of the thrust carried by the member 10.

As shown, said thrust bearing unit comprises an exteriorly threaded shank 13 adapted to be threadedly received in the aperture 12 and provided with a head 14. Shank 13 is interiorly bored as shown at 15 said bore terminating in a shoulder 16. Shank 13 may have an unthreaded extension of sufficient length to project beyond the inner unthreaded portion 17 of the aperture 12 so as to provide a safety abutment to receive and carry the load of the member 10 in the event of failure of the parts to be described, but by preference said extension is formed as a separate extension sleeve 18 to facilitate introduction thereof when only a confined space exists between the outer face of member 11 and any adjacent flange, wall or the like.

Mounted within said bore 15 is a sleeve 19 seated on the shoulder 16 and composed of any suitable metal which can be appreciably compressed under the thrust load to be measured, said sleeve being of sufficient radial thickness to assure against buckling or other deformation under the thrust load to be measured. The inner end 20 of sleeve 19 is engaged by the end of a thrust transmitting sleeve 21 provided with a head 22 which projects beyond the end of the extension sleeve 18 into a position where, as shown, it engages the spherically faced insert 23 at the rear of the shoe 10 or otherwise is in supporting relationship to the member normally supported by the replaced jackscrew. The load on member 10 is thus transmitted to the head 22 of sleeve 21, and said sleeve through the abutting end surface 20 transmits the load to the compressible sleeve 19 that is seated on the shoulder 16. The thrust transmitted to the shoulder 16 is transferred through the head and shank of the device to the member 11 the same as if the jackscrew were in position. However, the compression of the member 19 in transmitting the load from the sleeve 21 to the shoulder 16 constitutes a measure of the thrust on the member 10.

To measure said thrust, head 22 has suitably attached thereto, as by a pin 24, a rod 25 for actuating suitable indicating mechanism that will show the extent of movement of the head 22 by reason of the compression of the sleeve 19. Rod 25 is also preferably made in sections as shown at the joint 26 to facilitate introduction of the parts when the device must be installed from a relatively confined space. The outer end of rod 25 projects through an aperture 27 in the head 14, and preferably has attached thereto, as by pin 28, a spring seat 29 between which and the wall surrounding aperture 27 a light spring 30 reacts to take up all slack or backlash.

Mounted on the exteriorly projecting head 14 of the device as so far described is indicating mechanism of any suitable character. As shown, the head 14 is reduced in diameter at 31 and clamped thereabout is a bracket for supporting the indicating instrument, here shown as including a split resilient ring 32 which may be tightened by a screw 33. Bracket 32 has suitable provision for holding an indicator in operative position, said provision being shown as a second split resilient ring 34 operable by screw 35. Clamped by said ring 34 is the shank 36 of any suitable indicating mechanism 37 having its actuator 38 projected through the shank 36 and into engagement with the end 39 of the rod 25.

The measuring device as so far described can be readily installed wherever a correspondingly sized jackscrew has been removed, and when in position as shown in the drawing will function as a normal jackscrew. However, the load carried by the member 10 is transmitted to the head 22 of sleeve 21 and thence to the axially compressible sleeve 19 seated on the shoulder 16. The extent to which said sleeve 19 is axially compressed is a measure of the thrust load on member 10, and the extent of compression is measured by transmitting the movement of the head 22 through the rod 25 to the actuator 38 of the indicator 37. By suitably calibrating the indicator 37 or by providing suitable conversion tables, the indication on the indicator 37 as a measure of the compression of the sleeve 19, is a direct and accurate measurement of the load carried by the member 10, and knowing the share of the total load carried by member 10, the entire load on the bearing may be easily calculated.

It will therefore be perceived that by the present invention a simple, strong, rugged and highly efficient thrust measuring device has been provided which may be readily installed in place of a conventional jackscrew and either left there permanently or transferred from bearing to bearing as occasion requires for the purpose of determining thrust loads. Therefore, the thrust measuring device may be used without interfering with the normal operation of the bearing and at the same time it provides an accurate and ready determination of the load. Chance of failure of the thrust measuring device is minimized by the fact that the thrust load is carried entirely by the compression of a sleeve that is unlikely to buckle or otherwise fail. However, in the event that the compression sleeve 19 should fail the load on the member 10 is received by the projecting end of the sleeve 18 and the device continues to function as if a normal jackscrew were present. The measuring device can be easily installed and withdrawn, and by making the parts in section as above indicated, installation and withdrawal are facilitated even though the operator has to work from a relatively confined space.

In the foregoing description it has been assumed that the sleeve 21, either by reason of its length or by the material of which it is composed as compared with the material of sleeve 19, has relatively little compressibility under the loads sustained. However, as will be apparent to those skilled in the art, the sleeve 21 may also be made of compressible material, in which event the total compression effected by the load will be the sum of the compressions of sleeves 19 and 21. In either event, however, the indicating mechanism 37, by its calibration, will show the thrust sustained by properly correlating the amount of movement transmitted by the rod 25 to said indicating mechanism to known loads so that the total compression produced in members 19, 21 as shown at the indicating mechanism 37 will be a measure of the thrust sustained.

While the embodiment of the invention illustrated on the drawing has been described with considerable particularity, it is to be expressly understood that the invention is not limited thereto, as the same is capable of receiving a variety of mechanical expressions, some of which will now readily suggest themselves to those skilled in the art, while changes may be made in the details of construction, size, arrangement and proportion of parts, etc., without departing from the spirit of this invention. Reference is therefore to be had to the appended claims for a definition of the invention.

What is claimed is:

1. In a thrust measuring device for thrust bearings including at least one jackscrew for supporting a thrust sustaining member of the bearing, a hollow threaded shank for reception in the threaded aperture provided for the jackscrew, a sleeve in said shank constructed of material which is compressible upon application of thrust pressure thereto, said shank having an abutment engaged by said compression sleeve, means for transmitting thrust pressure from a member of the bearing to said compression sleeve, and means having an axially extending connection to said transmitting means for indicating the extent of movement of said transmitting means when said compression member is put under compression.

2. In a thrust measuring device for thrust bearings including at least one jackscrew for supporting a thrust sustaining member of the bearing, a hollow threaded shank for reception in the threaded aperture provided for the jackscrew, said shank being provided interiorly with a shoulder, a compression sleeve mounted on said shoulder, means for transmitting to said compression sleeve the thrust pressure on a member of the bearing, and means disposed at the outer extremity of said shank and operatively connected to said transmitting means for indicating the extent of compression of said compression sleeve.

3. In a thrust measuring device for thrust bearings including at least one jackscrew for supporting a thrust sustaining member of the bearing, a hollow threaded shank for reception in the threaded aperture provided for the jackscrew, said shank having a hollow bore terminating in a shoulder, a compression sleeve seated on said shoulder, a thrust transmitting member mounted in said bore in engagement with said sleeve and projecting beyond the end thereof to receive thrust from a member of the bearing, and means having a connection to said member extending axially through said sleeve for indicating the displacement thereof when said sleeve is under compression.

4. In a thrust measuring device for thrust bearings including at least one jackscrew for supporting a thrust sustaining member of the bearing, a hollow threaded shank for reception in the threaded aperture provided for the jackscrew, said shank having a hollow bore terminating in a shoulder, a compression sleeve seated on said shoulder, a second sleeve mounted in said bore in engagement with said compression sleeve and having a head projecting beyond the end of the bore to receive thrust from a member of the bearing, and means having a connection to said head extending axially through said sleeve for indicating the displacement of said head when said sleeve and member are under thrust.

5. In a thrust measuring device for thrust bearings including at least one jackscrew for supporting a thrust sustaining member of the bearing, a hollow threaded shank for reception in the threaded aperture provided for the jackscrew, said shank having a hollow bore terminating in a shoulder, a compression sleeve in said bore seated on said shoulder, a thrust transmitting member mounted in said bore in engagement with said sleeve and projecting beyond the end thereof to receive thrust from a member of the bearing, a rod connected to said thrust transmitting member and extending axially through said sleeve, and means in engagement with said rod for indicating the displacement of said thrust transmitting member when said compression sleeve is under compression.

6. In a thrust measuring device for thrust bearings including at least one jackscrew for supporting a thrust sustaining member of the bearing, a hollow threaded shank for reception in the threaded aperture provided for the jackscrew, an extension sleeve providing an extension of said shank, said shank having an internal bore terminating in a shoulder, a compression sleeve seated on said shoulder, a thrust transmitting member in said extension sleeve projecting beyond the end thereof and in engagement with said compression sleeve, said thrust transmitting member having a head for receiving thrust from a member of the thrust bearing, a jointed rod connected to said thrust transmitting member and extending axially through said sleeve, and means engaged with said rod for indicating displacement of said thrust transmitting member when said compression sleeve is under compression.

ARTHUR B. LAKEY.

REFERENCES CITED

The following references are of record in the file of this patent:

UNITED STATES PATENTS

| Number | Name | Date |
|---|---|---|
| 306,582 | Chase | Oct. 14, 1884 |
| 1,112,320 | Price | Sept. 29, 1914 |
| 1,281,389 | Kaupert | Oct. 15, 1918 |
| 1,883,154 | Watrous | Oct. 18, 1932 |
| 2,396,916 | Guthrie | Mar. 19, 1946 |